(12) United States Patent
Shimoda et al.

(10) Patent No.: US 8,704,942 B2
(45) Date of Patent: Apr. 22, 2014

(54) IMAGING DEVICE HAVING AN IMAGE GENERATION PIXEL AND A PHASE DIFFERENCE DETECTION PIXEL

(75) Inventors: Kazuhito Shimoda, Kyoto (JP); Shinichi Fujii, Kanagawa (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 13/372,694

(22) Filed: Feb. 14, 2012

(65) Prior Publication Data

US 2012/0212662 A1 Aug. 23, 2012

(30) Foreign Application Priority Data

Feb. 21, 2011 (JP) ................ P2011-034955

(51) Int. Cl.
*G03B 13/00* (2006.01)
*H04N 5/225* (2006.01)
(52) U.S. Cl.
USPC ............ 348/350; 348/280; 348/340; 348/349
(58) Field of Classification Search
USPC ........................................ 348/350
See application file for complete search history.

(56) References Cited

U.S. PATENT DOCUMENTS

| 7,978,255 B2 | 7/2011 | Suzuki |
| 8,098,321 B2 * | 1/2012 | Shimoda et al. ............. 348/349 |
| 8,319,882 B2 * | 11/2012 | Fujii et al. .................... 348/345 |
| 8,478,123 B2 * | 7/2013 | Cao et al. ..................... 396/333 |
| 2009/0146046 A1 * | 6/2009 | Katsuda et al. ............ 250/201.6 |
| 2009/0225217 A1 * | 9/2009 | Katsuda et al. ............... 348/366 |

FOREIGN PATENT DOCUMENTS

| JP | 2009-109965 | * | 5/2009 | ............ H04N 5/335 |
| JP | 2009-109965 A | | 5/2009 | |

* cited by examiner

*Primary Examiner* — Ngoc-Yen Vu
(74) *Attorney, Agent, or Firm* — Lerner, David, Littenberg, Krumholz & Mentlik, LLP (57) ABSTRACT

An imaging device includes a micro lens that collects light from a subject, a light sensing element that generates a signal for performing focusing determination through phase difference detection by sensing subject light collected by the micro lens, a first light blocking unit that performs pupil division by blocking a portion of the subject light, and a second light blocking unit that is disposed between the first light blocking unit and the micro lens, and blocks the portion of the subject light which is incident to the first light blocking unit, wherein an aperture area of the second light blocking unit is smaller than an aperture area of an image generation pixel.

8 Claims, 8 Drawing Sheets

IMAGING DEVICE HAVING AN IMAGE GENERATION PIXEL AND A PHASE DIFFERENCE DETECTION PIXEL

CROSS-REFERENCE TO RELATED APPLICATION

The present application claims priority from Japanese Patent Application No. JP 2011-034955 filed in the Japanese Patent Office on Feb. 21, 2011, the entire content of which is incorporated herein by reference.

BACKGROUND

The present disclosure relates to an imaging device, and more particularly to an imaging device and an imaging apparatus which detect a phase difference.

In recent years, there has been spread use of an imaging apparatus such as a digital still camera which generates a captured image by imaging a subject such as a figure, and records the captured image generated. In addition, as the imaging apparatus, in order to make a photographing operation of a user simple, there has been widespread use of an imaging apparatus which has an auto focus (AF) function of automatically performing focus adjustment at the time of imaging.

As the imaging apparatus, there has been proposed an imaging apparatus in which, for example, light passing through an imaging lens is divided through pupil division so as to form a pair of images, and a position of the imaging lens is determined by measuring a gap between the formed images (detecting a phase difference). For example, there has been proposed an imaging apparatus in which both of pixels (phase difference detection pixels) for phase difference detection (focal point detection) which performs pupil division by blocking half of subject light sensed by a light sensing element and pixels for generation of captured images (image generation pixels) are provided in a single imaging device. In a case where the imaging apparatus performs phase difference detection, a pair of images is formed based on a signal from the phase difference detection pixels, and a focus misalignment amount is calculated by measuring a gap between the formed images. Thereafter, the imaging apparatus calculates a movement amount of the imaging lens based on the calculated focus misalignment amount, and performs focusing by adjusting a position of the imaging lens based on the calculated movement amount (focus adjustment).

Here, in order to perform the phase difference detection and image generation with higher accuracy, there has been proposed an imaging apparatus in which a light collection position in the phase difference detection pixels and a light collection position in the image generation pixels are made to be different from each other (for example, refer to Japanese Unexamined Patent Application Publication No. 2009-109965). In the imaging apparatus, characteristics of micro lenses provided in the phase difference detection pixels and characteristics of micro lenses provided in the image generation pixels are made to be different from each other by changing a lens thickness, a lens diameter, or a lens material. Alternatively, in the imaging apparatus, a distance between the micro lens and the light sensing element in the phase difference detection pixels and a difference between the micro lens and the light sensing element in the image generation pixels are made to be different from each other.

SUMMARY

In the above-described related art, a light collection position in the image generation pixels is set on the light sensing element side, and a light collection position in the phase difference detection pixels is set further on the micro lens than the light collection position in the image generation pixels.

However, in the above-described related art, manufacturing processes are complicated in order to make the phase difference detection pixels and the image generation pixels have different lenses or the phase difference detection pixel and the image generation pixel have different structures. If the manufacturing processes are complicated, manufacturing costs increase or new problems occur in the manufacturing processes. Therefore, it is important to improve characteristics of the phase difference detection pixel without complicating manufacturing processes.

It is desirable to improve characteristics of a phase difference detection pixel in an imaging device.

According to an embodiment of the present disclosure, there is provided an imaging device including a micro lens that collects light from a subject; a light sensing element that generates a signal for performing focusing determination through phase difference detection by sensing subject light collected by the micro lens; a first light blocking unit that performs pupil division by blocking a portion of the subject light; and a second light blocking unit that is disposed between the first light blocking unit and the micro lens, and blocks the portion of the subject light which is incident to the first light blocking unit, wherein an aperture area of the second light blocking unit is smaller than an aperture area of an image generation pixel. This leads to an operation that the aperture area in the phase difference detection pixel is made to be smaller than the aperture area in the image generation pixel.

The second light blocking unit may be formed by the same layer as a light blocking layer which forms an aperture portion related to the aperture area of the image generation pixel. This leads to an operation that the second light blocking unit of the a phase difference detection pixel and the light blocking layer which forms an aperture portion related to the aperture area of the image generation pixel are formed by the same layer.

In addition, the second light blocking unit may be formed by a layer close or adjacent to the micro lens, of layers blocking light between the micro lens and the light sensing element. This leads to an operation that a light blocking layer close to the micro lens is used as the second light blocking unit.

Further, the micro lens may be a micro lens having the same shape as a micro lens which collects light incident to the image generation pixel. This leads to an operation that the same lens is used as the micro lens of the phase difference detection pixel and the micro lens of the image generation pixel.

In addition, a shape of the aperture portion related to the aperture area of the second light blocking unit may be similar to a shape of the aperture portion related to the aperture area of the image generation pixel. This leads to an operation that a shape of the aperture portion related to the aperture area of the second light blocking unit is made to be similar to a shape of the aperture portion related to the aperture area of the image generation pixel.

In addition, a shape of the aperture portion related to the aperture area of the second light blocking unit may be a shape where a portion of the aperture portion related to the aperture area of the image generation pixel is deleted. This leads to an operation that a shape of the aperture portion related to the aperture area of the second light blocking unit is made to be a shape where a portion of the aperture portion related to the aperture area of the image generation pixel is deleted.

According to another embodiment of the present disclosure, there is provided an imaging apparatus including an imaging device including a micro lens that collects light from a subject, a light sensing element that generates a signal for performing focusing determination through phase difference detection by sensing subject light collected by the micro lens, a first light blocking unit that performs pupil division by blocking a portion of the subject light, and a second light blocking unit that is disposed between the first light blocking unit and the micro lens, and blocks the portion of the subject light which is incident to the first light blocking unit, wherein an aperture area of the second light blocking unit is smaller than an aperture area of an image generation pixel; a focusing determination unit that performs focusing determination through phase difference detection based on a signal generated by a phase difference detection pixel; and an image generation unit that generates an image based on a signal generated by the image generation pixel. This leads to an operation that phase difference detection is performed using the imaging device where an aperture area of the phase difference detection pixel is made to be smaller than an aperture area of an image generation pixel.

According to still another embodiment of the present disclosure, there is provided an imaging device including a micro lens that collects subject light; a light sensing element that generates a signal for performing focusing determination through phase difference detection by sensing subject light collected by the micro lens; and a second light blocking unit that is disposed between the micro lens and an image forming point of the subject light collected by the micro lens in an optical axis direction of the micro lens, and enables an extent of light collection performed by the micro lens to be larger than an extent of light collection in an image generation pixel, wherein an aperture area of the second light blocking unit is smaller than an aperture area of the image generation pixel. This leads to an operation that the second light blocking unit for making an aperture area of the phase difference detection pixel smaller than an aperture area of an image generation pixel is made to be disposed between the micro lens and an image forming point of the subject light collected by the micro lens.

According to the embodiments of the present disclosure, it is possible to achieve an excellent effect of improving characteristics of a phase difference detection pixel in an imaging device.

DETAILED DESCRIPTION OF EMBODIMENTS

Hereinafter, embodiments of the present disclosure will be described. The description will be made in the following order.

1. FIRST EMBODIMENT (Imaging Control: an example where the aperture area of a phase difference detection pixel is smaller than the aperture area of an image generation pixel)

2. SECOND EMBODIMENT (Imaging Control: an example where an aperture shape of the phase difference detection pixel and an aperture shape of the image generation pixel)

1. First Embodiment

Functional Configuration Example of Imaging Apparatus

Figure 1:
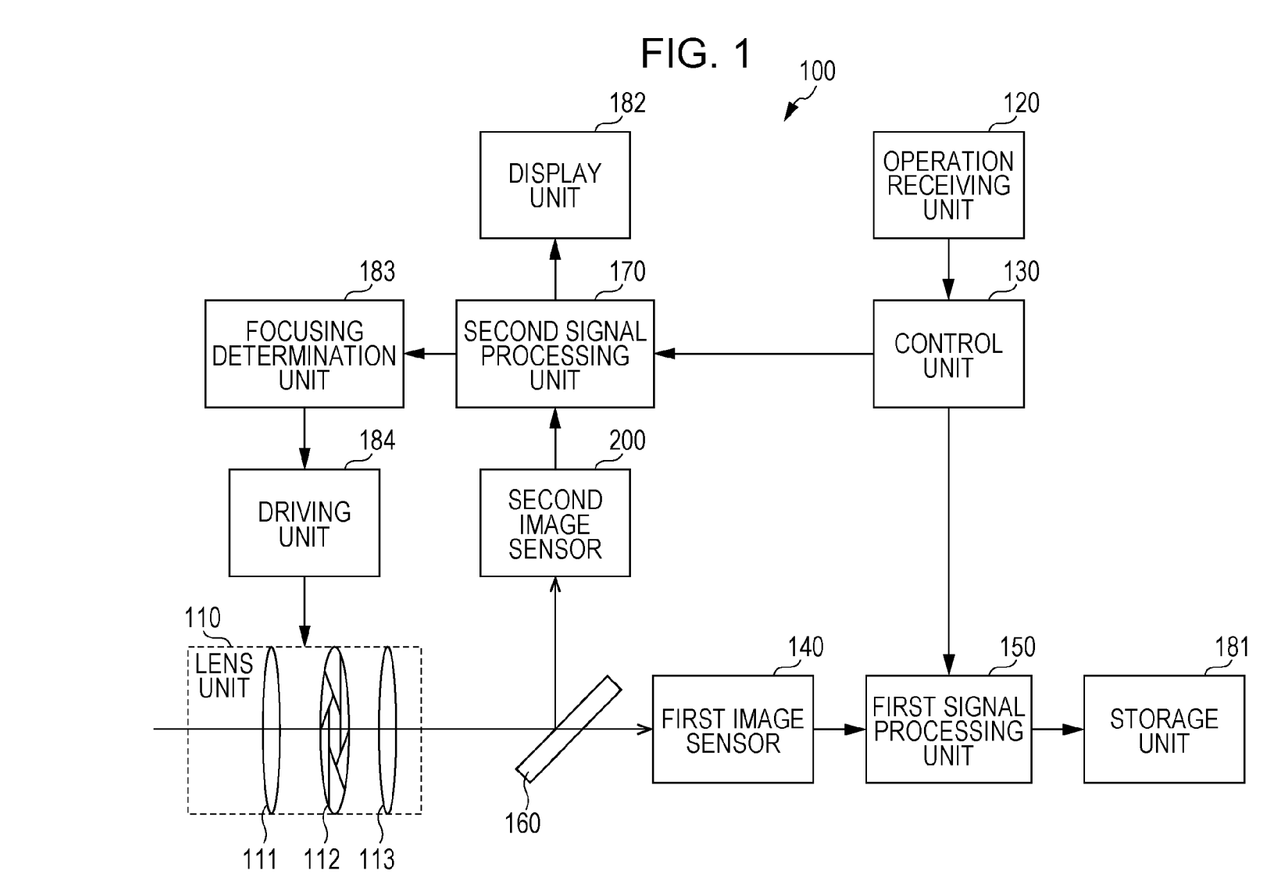
FIG. 1 is a block diagram illustrating an example of the functional configuration of an imaging apparatus according to a first embodiment of the present disclosure.

FIG. 1 is a block diagram illustrating an example of the functional configuration of an imaging apparatus 100 according to the first embodiment of the present disclosure. The imaging apparatus 100 is an imaging apparatus which generates image data (captured image) by imaging a subject and records the generated image data as image content (still image content or moving image content). In addition, hereinafter, an example where still image content (still image file) is recorded as image content (image file) will be mainly described.

The imaging apparatus 100 includes a lens unit 110, an operation receiving unit 120, a control unit 130, a first image sensor 140, and a first signal processing unit 150. Further, the imaging apparatus 100 includes a pellicle mirror 160, a second image sensor 200, a second signal processing unit 170, a storage unit 181, a display unit 182, a focusing determination unit 183, and a driving unit 184.

The lens unit 110 collects light from a subject (subject light). The lens unit 110 includes a zoom lens 111, a diaphragm 112, and a focus lens 113.

The zoom lens 111 is moved in the optical axis direction by driving of the driving unit 184 so as to vary a focal length, thereby adjusting the magnification of a subject included in a captured image.

The diaphragm 112 is a shield which varies an aperture extent through the driving of the driving unit 184 so as to adjust an amount of subject light incident to the first image sensor 140 and the second image sensor 200.

The focus lens 113 is moved in the optical axis direction by the driving of the driving unit 184, thereby adjusting focus.

The operation receiving unit 120 receives an operation from a user. For example, in a case where a shutter button (shutter button 121 shown in FIG. 2) is pressed, the operation receiving unit 120 supplies a signal regarding the pressing to the control unit 130 as an operation signal.

The control unit 130 controls operations of the respective units of the imaging apparatus 100. For example, if the shutter button is pressed and an operation signal for starting recording of a still image is received, the control unit 130 supplies a signal regarding recording and execution of a still image (still image capturing operation signal) to the first signal processing unit 150. In addition, in a case where a live view is displayed on the display unit 182, the control unit 130 supplies a signal for generating a live view image based on a signal output by the second image sensor 200, to the second signal processing unit 170. Here, the live view refers to real-time display of a subject image which is incident to the imaging apparatus 100. Further, in a case of performing focusing determination using a phase difference detection method, the control unit 130 supplies a signal (phase difference detection operation signal) indicating an operation (phase difference detection operation) performing the focusing determination, to the second signal processing unit 170. Here, the phase difference detection method is a focus detection method in which light passing through the imaging lens undergoes pupil division so as to form a pair of images, and a focusing extent is detected by measuring (detecting a phase difference) a gap between the formed images (a misalignment amount between the images).

The pellicle mirror 160 divides subject light collected via the lens unit 110 into two parts. The pellicle mirror 160 is, for example, a transflective mirror, and divides the subject light into two parts by reflecting 30% of the subject light. The pellicle mirror 160 supplies one of the light divided into two parts to the first image sensor 140 and supplies the other thereof to the second image sensor 200.

The first image sensor 140 is an imaging device which senses one of the subject light divided by the pellicle mirror 160 and performs photoelectric conversion for the sensed subject light to generate an electric signal. The first image sensor 140 is implemented by, for example, a CMOS (Complementary Metal Oxide Semiconductor) sensor, a CCD (Charge Coupled Device) sensor, or the like. In the first image sensor 140, only pixels (image generation pixels) which generates a signal for generating a captured image based on the sensed subject light are disposed in a Bayer array. The first image sensor 140 supplies an electric signal generated through the photoelectric conversion to the first signal processing unit 150.

The first signal processing unit 150 performs various kinds of signal processes for the electric signal supplied from the first image sensor 140. For example, in a case where the still image capturing operation signal is supplied from the control unit 130, the first signal processing unit 150 performs various kinds of signal processes, thereby generating data for a still image (still image data). In addition, the first signal processing unit 150 supplies the generated image data to the storage unit 181 for storage in the storage unit 181.

The storage unit 181 records the image data supplied from the first signal processing unit 150 as image content (image file). For example, as the storage unit 181, a removable recording medium (one or a plurality of recording media) such as a disc such as a DVD (Digital Versatile Disc) or a semiconductor memory such as a memory card may be used. In addition, the recording medium may be built in the imaging apparatus 100 or may be attachable to and detachable from the imaging apparatus 100.

The second image sensor 200 is an imaging device which senses one of the subject light divided by the pellicle mirror 160, and performs photoelectric conversion for the sensed subject light to generate an electric signal. The second image sensor 200 is implemented by, for example, a CMOS sensor or a CCD sensor, in the same manner as the first image sensor 140. In the second image sensor 200, image generation pixels and pixels generating a signal for detecting a phase difference (phase difference detection pixels) are disposed. In addition, the second image sensor 200 will be described with reference to FIGS. 3 to 8C. The second image sensor 200 supplies an electric signal generated through the photoelectric conversion to the second signal processing unit 170. In addition, the second image sensor 200 is an example of the imaging device recited in the claims.

The second signal processing unit 170 performs various kinds of signal processes for the electric signal supplied from the second image sensor 200. For example, in a case where the phase difference detection operation signal is supplied from the control unit 130, the second signal processing unit 170 generates data for detecting a phase difference (phase difference detection data) based on an output signal from the phase difference detection pixels in the second image sensor 200. In addition, the second signal processing unit 170 supplies the generated phase difference detection data to the focusing determination unit 183. Further, in a case where a live view display signal is supplied from the control unit 130, the second signal processing unit 170 generates data for a live view image (live view image data) based on an output signal from the image generation pixels in the second image sensor 200. The second signal processing unit 170 supplies the generated live view image data to the display unit 182, and displays the live view on a display screen of the display unit 182. In addition, the second signal processing unit 170 is an example of the image generation unit recited in the claims.

The display unit 182 displays an image based on the image data supplied from the second signal processing unit 170. The display unit 182 is implemented by, for example, a color liquid crystal panel. For example, in a case where the live view image data is supplied from the second signal processing unit 170, the display unit 182 displays a live view image on the display screen.

The focusing determination unit 183 determines whether or not a target to be focused (focusing target) is focused based on the phase difference detection data supplied from the second signal processing unit 170. If an object (focusing target) in a region which is focused (focus region), the focusing determination unit 183 supplies information indicating the focusing to the driving unit 184 as focusing determination result information. In addition, if the focusing target is not focused, the focusing determination unit 183 calculates a focus misalignment amount (defocus amount), and supplies information indicating the calculated defocus amount to the driving unit 184 as focusing determination result information.

The driving unit 184 drives the zoom lens 111, the diaphragm 112, and the focus lens 113. For example, the driving unit 184 calculates a driving amount of the focus lens 113 based on the focusing determination result information output from the focusing determination unit 183, and moves the focus lens 113 according to the calculated driving amount. If the focus is aligned, the driving unit 184 maintains a current position of the focus lens 113. In addition, if the focus is misaligned, the driving unit 184 calculates a driving amount (movement distance) based on the focusing determination result information indicating the defocus amount and positional information of the focus lens 113, and moves the focus lens 113 according to the driving amount.

Position Example of Pellicle Mirror

Figure 2:
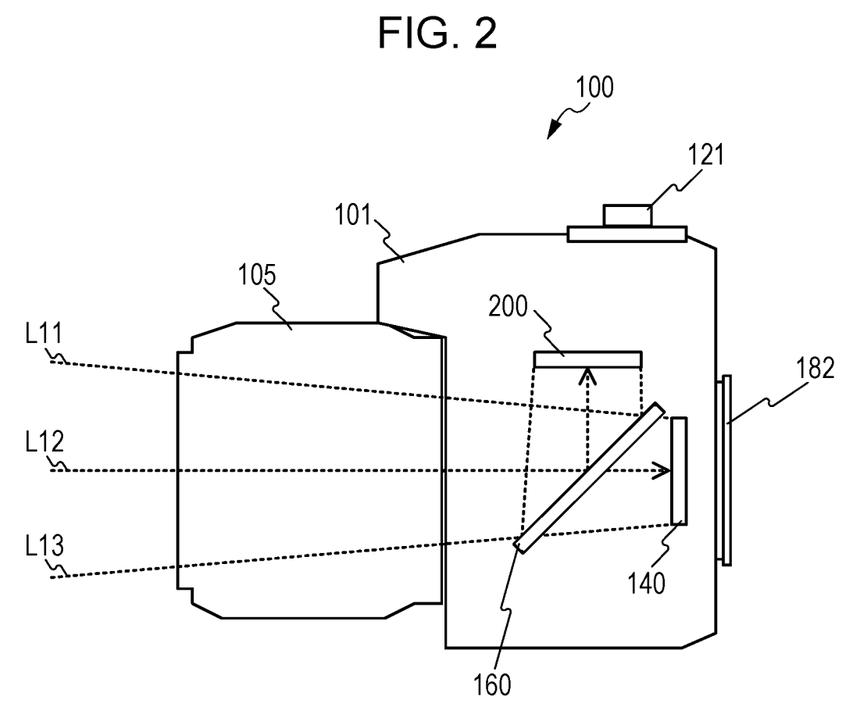
FIG. 2 is a cross-sectional view schematically illustrating an example of the position of the pellicle mirror in the imaging apparatus according to the first embodiment of the present disclosure.

FIG. 2 is a cross-sectional view schematically illustrating an example of the position of the pellicle mirror 160 in the imaging apparatus 100 according to the first embodiment of the present disclosure. In addition, description will be made assuming that the imaging apparatus 100 is a single lens camera in the same figure.

FIG. 2 is a cross-sectional view of the imaging apparatus 100, and shows a body 101 and a replacement lens 105. The replacement lens 105 is an attachable and detachable lens unit in the imaging apparatus 100, and corresponds to the lens unit 110 shown in FIG. 1. The body 101 is a main body which performs an imaging process in the imaging apparatus 100 and corresponds to the configuration other than the lens unit 110 shown in FIG. 1. In the body 101, the shutter button 121, the display unit 182, the pellicle mirror 160, the first image sensor 140, the second image sensor 200, and the replacement lens 105 are shown.

In addition, in the same figure, the optical axis (optical axis L12) in the lenses provided in the lens unit 110, and two lines (lines L11 and L13) indicating a range where the subject light passes, are shown. Further, the range between the lines L11 and L13 indicates a range where light incident to the first image sensor 140 and the second image sensor 200 passes.

The pellicle mirror 160 is disposed so as to divide subject light incident to the imaging apparatus 100 into two parts. For example, the pellicle mirror 160 is disposed so as to form 45° with respect to the optical axis L12. Thereby, the pellicle mirror 160 reflects a portion of the subject light (for example, 30%) upwards.

The first image sensor 140 is disposed perpendicularly to the optical axis L12 in front (traveling destination of the subject light) of the pellicle mirror 160 so as to sense the subject light transmitted through the pellicle mirror 160.

The second image sensor 200 is disposed horizontally to the optical axis L12 (because the pellicle mirror 160 forms 45° with respect to the optical axis L12) on the upper side of the pellicle mirror 160 so as to sense the subject light reflected by the pellicle mirror 160.

As above, in the imaging apparatus 100, the pellicle mirror 160 is disposed so as to divide incident subject light into two parts. The first image sensor 140 and the second image sensor 200 are respectively disposed so as to sense the subject light divided into two parts.

Arrangement Example of Pixels in Second Image Sensor

Figure 3:
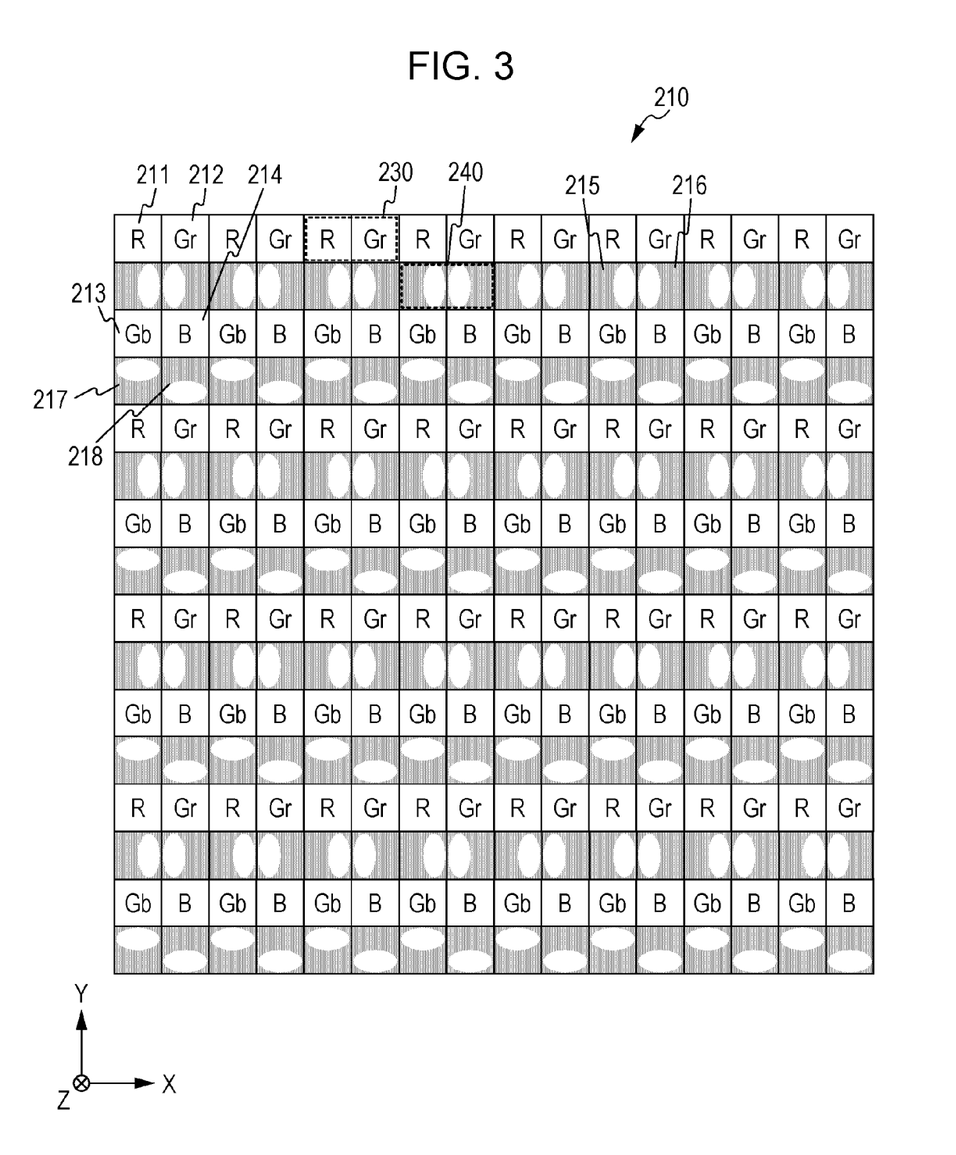
FIG. 3 is a schematic diagram illustrating an example of the arrangement of pixels provided in the second image sensor according to the first embodiment of the present disclosure.

FIG. 3 is a schematic diagram illustrating an example of the arrangement of the pixels provided in the second image sensor 200 according to the first embodiment of the present disclosure.

Description will be made assuming of XY axes having the vertical direction as a Y axis, and the horizontal direction as an X direction in the same figure. In addition, in the same figure, the bottom left corner is assumed as an origin at the XY axes, the upward direction is + side of the Y axis, and the rightward direction is + side of the X axis. Further, in the same figure, a specific direction (direction corresponding to the horizontal direction (left and right direction) of a captured image) in the second image sensor 200 is the X axis direction, and a direction (direction corresponding to the vertical direction (up and down direction) of the captured image) perpendicular to the specific direction is the Y axis direction. It is assumed that a signal reading direction in the second image sensor 200 is the X axis direction (read with the row units).

In FIG. 3, for convenience of description, the description is made using a region (region 210) of a portion (pixels of 16 rows×16 columns) of pixels included in the second image sensor 200. In addition, the pixels in the second image sensor 200 are arranged such that the pixel arrangement shown in the region 210 corresponds to one unit, and the pixel arrangement corresponding to the unit (pixel arrangement corresponding to the region 210) is repeated in the X axis direction and the Y axis direction.

In the same figure, a pixel is denoted by a square. In addition, in the same figure, the image generation pixels are denoted by squares containing signs (R, G and B) which indicate color filters provided therein. That is to say, an R pixel 211 indicates a pixel (R pixel) sensing red light by a color filter which transmits red (R) light therethrough, and a B pixel 214 indicates a pixel (B pixel) sensing blue light by a color filter which transmits blue (B) light therethrough. In addition, a Gr pixel 212 is a pixel (G pixel) sensing green light by a color filter which transmits green (R) light therethrough, and indicates a G pixel in a row (line) including the R pixel (R pixel 211). Similarly, a Gb pixel 213 is a pixel (G pixel) sensing green light by a color filter which transmits green (R) light therethrough, and indicates a G pixel in a row (line) including the B pixel (B pixel 214).

In addition, the phase difference detection pixel is denoted by a gray square to which a white ellipse is added. The white ellipse in the phase difference detection pixel indicates a side where incident light is sensed by the light sensing element (a side where an aperture portion is present in a light blocking layer (pupil division light blocking layer) for performing pupil division). Here, the phase difference detection pixels (a right aperture phase difference detection pixel 215, a left aperture phase difference detection 216, an upper aperture phase difference detection pixel 217, and a lower aperture phase difference detection 218) shown in the same figure will be described.

The right aperture phase difference detection pixel 215 is a phase difference detection pixel where the pupil division light blocking layer is formed so as to block subject light which has passed through the right half of the exit pupil, of subject light incident to a micro lens of the right aperture phase difference detection pixel 215. In other words, the right aperture phase difference detection pixel 215 blocks right half light of light which is pupil-divided into left and right (the + and − sides in the X axis direction) of the exit pupil, and senses left half pupil-divided light.

The left aperture phase difference detection pixel 216 is a phase difference detection pixel where the pupil division light blocking layer is formed so as to block subject light which has passed through the left half of the exit pupil, of subject light incident to a micro lens of the left aperture phase difference detection pixel 216. In other words, the left aperture phase difference detection pixel 216 blocks left half light of light which is pupil-divided into left and right (the + and − sides in the X axis direction) of the exit pupil, and senses right half pupil-divided light. In addition, the left aperture phase difference detection 216 is used with the right aperture phase difference detection pixel 215 as a pair, so as to form a pair of images.

The upper aperture phase difference detection pixel 217 is a phase difference detection pixel where the pupil division light blocking layer is formed so as to block subject light which has passed through the upper half of the exit pupil, of subject light incident to a micro lens of the upper aperture phase difference detection pixel 217. In other words, the upper aperture phase difference detection pixel 217 blocks upper half light of light which is pupil-divided into upper and lower parts (the + and − sides in the Y axis direction) of the exit pupil, and senses lower half pupil-divided light.

The lower aperture phase difference detection pixel 218 is a phase difference detection pixel where the pupil division light blocking layer is formed so as to block subject light which has passed through the lower half of the exit pupil, of subject light incident to a micro lens of the lower aperture phase difference detection pixel 218. In other words, the lower aperture phase difference detection pixel 218 blocks lower half light of light which is pupil-divided into upper and lower parts (the + and − sides in the Y axis direction) of the exit pupil, and senses upper half pupil-divided light. In addition, the lower aperture phase difference detection 218 is used with the upper aperture phase difference detection pixel 217 as a pair, so as to form a pair of images.

Here, the pixel arrangement in the second image sensor 200 will be described.

In the second image sensor 200, a row (line) where the image generation pixel is arranged and a row (line) where the phase difference detection pixel is arranged are alternately arranged. That is to say, as shown in FIG. 3, the image generation pixel, the phase difference detection pixel, the image generation pixel, the phase difference detection pixel, . . . are alternately arranged in the Y axis direction. In addition, in the second image sensor 200, in terms of the arrangement of only the image generation pixel except for the rows where the phase difference detection pixels are arranged, the row where the B pixel and the G pixel are arranged and the row where the R pixel and the G pixel are arranged are alternately arranged, which forms a Bayer array.

In addition, in the second image sensor 200, the line where the right aperture phase difference detection pixel 215 and the left aperture phase difference detection 216 are arranged and the line where the upper aperture phase difference detection pixel 217 and the lower aperture phase difference detection 218 are arranged are alternately arranged with the row of the image generation pixels interposed therebetween. That is to say, in relation to the phase difference detection pixel, the phase difference detection pixels performing pupil division are arranged in the same direction (a reading direction (left and right) or a direction (upper and lower) perpendicular to the reading direction) with the row units.

Next, a cross-sectional configuration of the image generation pixel and a cross-sectional configuration of the phase difference detection pixel according to the first embodiment of the present disclosure will be described using the regions 230 and 240 shown in FIG. 3.

Figure 4A:
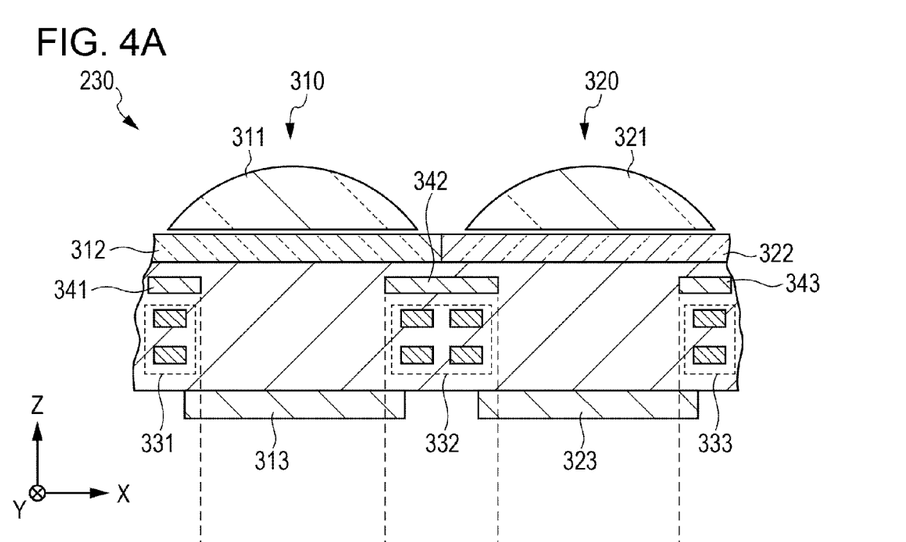
FIGS. 4A and 4B are schematic diagrams illustrating an example of the cross-sectional configuration of the image generation pixels and the phase difference detection pixels according to the first embodiment of the present disclosure.
Figure 4B:
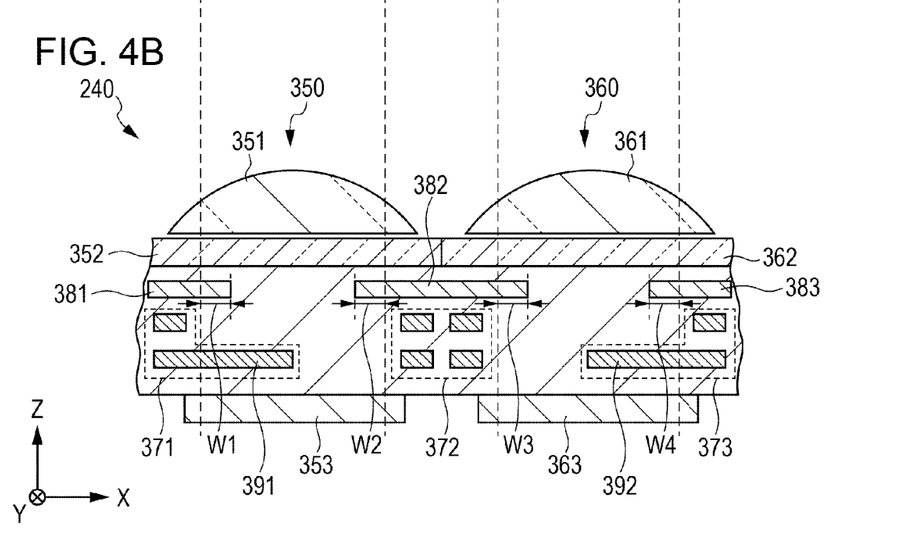

Cross-Sectional Configuration Example of Image Generation Pixel and Phase Difference Detection Pixel FIGS. 4A and 4B are schematic diagrams illustrating an example of the cross-sectional configurations of the image generation pixel and the phase difference detection pixel according to the first embodiment of the present disclosure.

FIG. 4A schematically shows a cross-sectional configuration of the image generation pixels (the R pixel and the Gr pixel (simply referred to as a G pixel in the same figure)) in the region 230 shown in FIG. 3. In addition, a difference among the three-color image generation pixels (the R pixel, the G pixel, and the B pixel) in the first embodiment of the present disclosure is only a color filter, and thus only the R pixel (R pixel 310) and the G pixel (G pixel 320) will be described in FIG. 4A. In addition, the same figure shows a cross-sectional configuration where the horizontal direction is an X axis direction, and the vertical direction is a Z axis direction.

FIG. 4A shows micro lenses (micro lenses 311 and 321) of the R pixel 310 and the G pixel 320, and light sensing elements (light sensing elements 313 and 323) of the two pixels. Further, FIG. 4A shows color filters (an R filter 312 and a G filter 322) of the R pixel 310 and the G pixel 320, light blocking layers (light blocking layers 341 to 343) of the two pixels, and wires (wires 331 to 333) disposed at edges of the two pixels.

The micro lenses 311 and 321 are lenses for collecting subject light at the light sensing elements. The micro lens 311 collects subject light at the light sensing element 313, and the micro lens 321 collects subject light at the light sensing element 323.

The light sensing element 313 and the light sensing element 323 converts the sensed light into an electric signal (accumulates charge corresponding to a light amount) so as to generate an electric signal with intensity corresponding to an amount of the sensed light. The light sensing element 313 and the light sensing element 323 are formed by, for example, a photodiode (PD). In addition, the light sensing element 313 is a light sensing element of the R pixel 310, and the light sensing element 323 is a light sensing element of the G pixel 320. Further, the light sensing element 313 and the light sensing element 323 which have as a wide area as possible are disposed in order to sense light collected by the micro lens of each image generation pixel with economy.

The R filter 312 and the G filter 322 are filters which transmit light of a specific wavelength range therethrough. The R filter 312 is a color filter which light of a wavelength range showing red (R) therethrough, and allows light of the wavelength range showing red to be sensed by the light sensing element 313 of the R pixel 310. In addition, the G filter 322 is a color filter which light of a wavelength range showing green (G) therethrough, and allows light of the wavelength range showing green to be sensed by the light sensing element 323 of the G pixel 320.

The wires 331 to 333 are wires for connecting the respective circuits to each other in the R pixel 310 and the G pixel 320. In the wires for connecting the respective circuits to each other, for example, two wires are disposed in a layer form like the wires 331 to 333 shown in FIG. 4A. In addition, the wires 331 to 333 are metals, and thus function as light blocking layers which block subject light from reaching adjacent pixels. Further, the wires 331 to 333 are disposed so as not to hinder light from entering the light sensing elements 313 and 323.

The light blocking layers 341 to 343 block subject light so as to restrict incidence of subject light to the light sensing elements. The light blocking layers 341 to 343 are formed using, for example, a metal. The gap between the light blocking layers in the light blocking layers 341 to 343 is the smallest in the image generation pixel. For example, in the R pixel 310, the gap (the aperture portion) between the light blocking layer 341 and the light blocking layer 342 is the smallest in the layers (for example, the wires of the wires 331 and the wires of the wires 332) blocking light in the R pixel 310. In other words, the gap between the light blocking layers in the light blocking layers 341 to 343 forms an aperture portion of the image generation pixel.

FIG. 4B schematically shows a cross-sectional configuration of the phase difference detection pixels (the right aperture phase difference detection pixel and the left aperture phase difference detection pixel) in the region 240 shown in FIG. 3. In addition, in the first embodiment of the present disclosure, it is assumed that a filter (for example, a transparent layer, a W filter, or the like) which transmits light of a visible light range therethrough is provided in the color filter layer of the phase difference detection pixel. Further, in FIG. 4B, description will be made assuming that a filter (W filter) which transmits light of a visible light range therethrough but absorbs light of wavelengths other than that is used as the color filter of the phase difference detection pixel.

In addition, only a difference between the phase difference detection pixels in the first embodiment of the present disclosure is an arrangement direction of the pupil division light blocking layer. For this reason, in the same figure, a cross-sectional configuration of the right aperture phase difference detection pixel (right aperture phase difference detection pixel 350) and the left aperture phase difference detection (left aperture phase difference detection pixel 360) is described, and description of the upper aperture phase difference detection pixel and the lower aperture phase difference detection are omitted.

FIG. 4B shows micro lenses (micro lenses 351 and 361) of the right aperture phase difference detection pixel 350 and the left aperture phase difference detection 360, and light sensing elements (a light sensing element 353 and a light sensing element 363) of the two pixels. In addition, FIG. 4B shows color filters (W filters 352 and 362), light blocking layers (light blocking layers 381 to 383) and wires (wires 371 to 373) of the right aperture phase difference detection pixel 350 and the left aperture phase difference detection 360.

The micro lenses and the light sensing elements (micro lenses 351 and 361 and the light sensing elements 353 and 363) of the phase difference detection pixels are the same as the micro lenses and the light sensing elements of the image generation pixels shown in FIG. 4A. In addition, the W filters 352 and 362 are the same as the R filter and G filters shown in FIG. 4A except for the spectral characteristics. For this reason, here, attention is paid to the light blocking layers 381 to 383 and the wires 371 to 373 which will be described.

The wires 371 to 373 are wires for connecting the respective circuits to each other in the right aperture phase difference detection pixel 350 and the left aperture phase difference detection 360. In addition, the wires 371 to 373 function as light blocking layers in the same manner as the wires 331 to 333 shown in FIG. 4A.

In addition, the wires 371 include a wire layer (pupil division light blocking layer 391) which protrudes so as to block light from the left side of the light sensing element 353 to the periphery of the center. The pupil division light blocking layer 391 is disposed such that an image forming point of the main light beam passing through the micro lens 351 is located at the right end of the protrusion. That is to say, the pupil division light blocking layer 391 blocks subject light (portion of the subject light) having passed through the right half of the exit pupil, and the right aperture phase difference detection pixel 350 senses subject light having passed through the left half thereof. On the other hand, the wire other than the pupil division light blocking layer 391 in the wires 371 and the wires of the wires 372 are disposed so as not to hinder light from entering the light sensing element 353.

The wires 373 include a wire (pupil division light blocking layer 392) protruding so as to cover the left half of the light sensing element 363. The pupil division light blocking layer 392 functions as a pupil division light blocking layer, and blocks subject light having passed through the left half of the exit pupil, and the left aperture phase difference detection 360 senses subject light having passed through the right half of the exit pupil. Further, the wire other than the pupil division light blocking layer 392 in the wires 373 and the wires of the wires 372 are disposed so as not to hinder light from entering the light sensing element 363. The pupil division light blocking layers 391 and 392 are an example of the first light blocking unit recited in the claims.

The light blocking layers 381 to 383 block subject light so as to restrict incidence of the subject light to the light sensing elements in the same manner as the light blocking layers 341 to 343 shown in FIG. 4A. The light blocking layers 381 to 383 are the same layers as the light blocking layers 341 to 343. That is to say, the light blocking layers 381 to 383 are disposed between the micro lenses 351 and 361 and the pupil division light blocking layers 391 and 392. Further, the light blocking layers 381 to 383 are formed using layers close or adjacent to the micro lenses 351 and 361 of the metal layers formed in the imaging device. The light blocking layers 381 to 383 protrude toward the central sides of the light sensing element 353 and the light sensing element 363 as compared with the light blocking layers (the light blocking layers 341 and 343) of the image generation pixels shown in FIG. 4A, as indicated by the widths W1 to W4 in FIG. 4B. In addition, in the first embodiment of the present disclosure, shapes of the aperture portions formed by the light blocking layers 381 to 383 are similar to the shapes of the aperture portions formed by the light blocking layers 341 to 343.

In other words, since the shapes of the aperture portions are similar to each other, the area of the aperture portions formed by the light blocking layers 381 to 383 is smaller than the area of the aperture portions of the image generation pixels (the aperture portions formed by the light blocking layers 341 to 343). A role (role in decreasing the aperture portion) of the protrusion of the light blocking layers in the phase difference detection pixels will be described with reference to FIGS. 5A to 7B. In addition, the light blocking layers 381 to 383 are an example of the second light blocking unit recited in the claims.

As described above, in the phase difference detection pixels, the light blocking layers (the light blocking layers 381 to 383 in FIG. 4B) close or adjacent to the micro lenses protrude further toward the light sensing elements of the respective pixels than the light blocking layers (the light blocking layers 341 to 343 in FIG. 4A) of the image generation pixels. That is to say, an aperture area of the aperture portion formed by the light blocking layers close or adjacent to the micro lenses of the phase difference detection pixels is smaller than an aperture area of the aperture portion formed by the light blocking layers close or adjacent to the micro lenses of the image generation pixels.

Figure 5A:
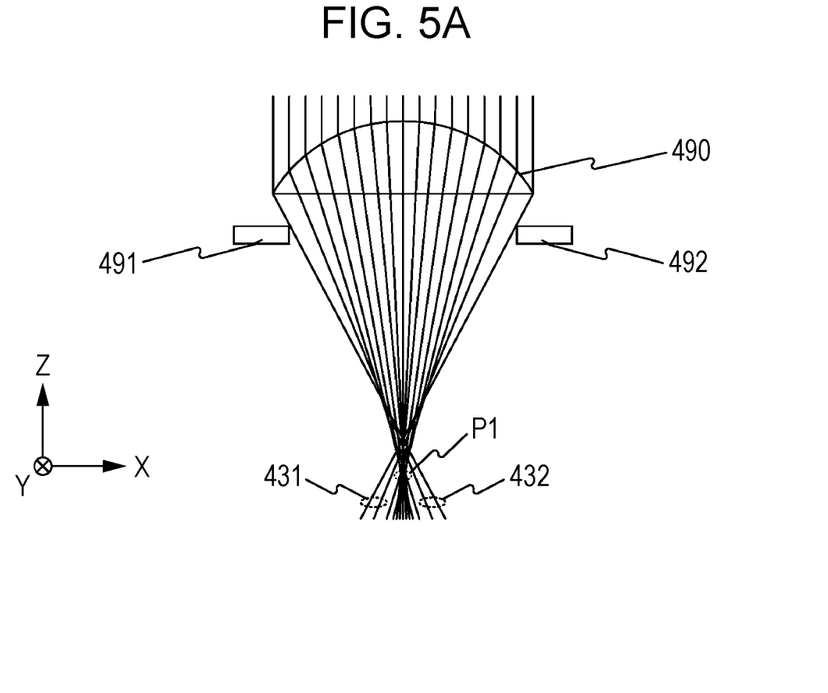
FIGS. 5A and 5B are schematic diagrams illustrating an example of the difference between the light blocking layer in the image generation pixel and the light blocking layer in the phase difference detection pixel according to the first embodiment of the present disclosure.
Figure 5B:
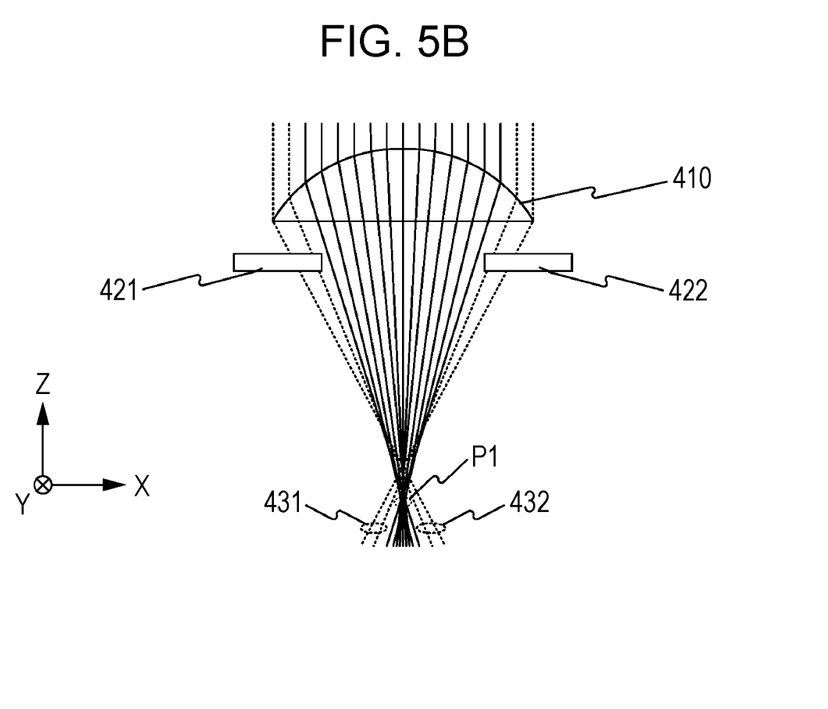

Example where Subject Light Having Passed Through Micro Lens is Blocked by Light Blocking Layer FIGS. 5A and 5B are schematic diagrams illustrating an example of the difference between the light blocking layers of the phase difference detection pixel and the light blocking layers of the image generation pixel according to the first embodiment of the present disclosure.

In the same figures, as an example, a role of the light blocking layer with respect to spherical aberration of the micro lens will be described. In FIG. 5A, the light blocking layers of the image generation pixel are described, and, in FIG. 5B, the light blocking layers of the phase difference detection pixel are described.

FIG. 5A schematically shows a relationship between the light blocking layers of the image generation pixel and subject light which passes through the micro lens and is sensed by the light sensing element. FIG. 5A shows a micro lens 490, and light blocking layers 491 and 492 as the micro lens and the light blocking layers of the image generation pixel. In addition, the micro lens 490, and the light blocking layers 491 and 492 are the same as the micro lenses 311 and 321 and the light blocking layers 341 to 343 shown in FIG. 4A, and description thereof will be omitted here.

In addition, FIG. 5A shows a plurality of solid lines indicating light paths parallel to the optical axis of the micro lens 490, an ideal image forming point (an image forming point P1) of light parallel to the optical axis, and regions 431 and 432 indicating paths of light beams which do pass through the image forming point P1.

Here, light beams which do not pass through the image forming point P1 (the solid lines passing through the regions 431 and 432 in FIG. 5A) will be described.

Ideally, the micro lenses covering the image generation pixel and the phase difference detection pixel enable light beams emitted from one point to form an image as a point. However, actually, it is difficult to dispose a micro lens which enables an image to be formed as an ideal point in the image generation pixel and the phase difference detection pixel due to various factors. For example, since light beams passing through a place distant from the optical axis of the micro lens have a great refractive index, as shown in FIG. 5A, light beams passing through regions close to the ends of the micro lens 490 are greatly deviated from the image forming point P1 (the solid lines passing through the regions 431 and 432 in FIG. 5A). In other words, since the light beams are not collected at the ideal image forming point, a spot diameter on an image forming plane of the light beams collected by the micro lens 490 (a spot diameter of which a position in the Z axis direction is located on the same plane as the image forming point P1) becomes large.

As such, if subject light beams are collected using the micro lens, light beams which are greatly deviated from the ideal image forming point are generated. In the image generation pixel, light beams which do not pass through the image forming point are incident to the light sensing element, and thus there is no problem caused by the not-passing-through (large spot diameter) of the image forming point. However, since, in the phase difference detection pixel, pupil division is performed by blocking a portion of light beams on the image forming plane by the pupil division light blocking layer, a light collection extent (spot diameter) influences pupil division accuracy (left and right division extent).

Therefore, in the phase difference detection pixel according to the first embodiment of the present disclosure, the light blocking layers between the micro lens and the pupil division light blocking layer are made to protrude so as to reduce the aperture area formed by the light blocking layer, thereby improving pupil division accuracy.

FIG. 5B schematically shows a relationship between the light blocking layers of the phase difference detection pixel and subject light which passes through the micro lens and is sensed by the light sensing element. FIG. 5B shows a micro lens 410, and light blocking layers 421 and 422 as the micro lens and the light blocking layers of the image generation pixel. In addition, the micro lens 410, and the light blocking layers 421 and 422 are the same as the micro lenses 351 and 361 and the light blocking layers 381 to 383 shown in FIG. 4B, and description thereof will be omitted here.

In addition, in the same manner as FIG. 5A, FIG. 5B shows a plurality of solid lines indicating light paths parallel to the optical axis of the micro lens 410, an image forming point P1, and regions 431 and 432. Further, in FIG. 5B, paths of light beams blocked by the light blocking layers 421 and 422 of light beams parallel to the optical axis of the micro lens 410 are denoted by the dotted lines.

Here, the light beams (the solid lines passing through the regions 431 and 432 in FIG. 5B) which do not pass through the image forming point P1 will be described.

The micro lens of the phase difference detection pixel has the same characteristics as the micro lens of the image generation pixel. That is to say, in the same manner as the case of the image generation pixel shown in FIG. 5A, a spot diameter of the light beams collected by the micro lens 410 (a spot diameter on the plane of the image forming point P1) becomes large in the phase difference detection pixel as well. Therefore, in the phase difference detection pixel, the aperture area of the aperture portion formed by the light blocking layers (the light blocking layers 421 and 422) between the pupil division light blocking layer and the micro lens is made to be smaller than the aperture area of the aperture portion formed by the light blocking layers of the image generation pixel. In other words, in a case where the shapes of the aperture portions are similar to each other, as shown in FIGS. 5A and 5B, the light blocking layers are disposed such that the width of the aperture portion in the light blocking layers (the light blocking layers 421 and 422) of the image generation pixel is smaller than the width of the aperture portion in the light blocking layers (the light blocking layers 491 and 492). Thereby, the light beams (light beams of which the paths are denoted by the broken lines in FIG. 5B) passing through the regions close to the ends of the micro lens 410 are blocked by the light blocking layers 421 and 422. That is to say, the light beams which are greatly deviated from the image forming point P1 are blocked by the light blocking layers 421 and 422. Thereby, the spot diameter on the image forming plane in the phase difference detection pixel becomes smaller than the spot diameter in the image generation pixel.

As such, in the phase difference detection pixel, the spot diameter on the image forming plane can be made to be smaller than that in the image generation pixel by the protruding light blocking layers (small aperture area). Thereby, it is possible to improve pupil division accuracy in the phase difference detection pixel.

Figure 6:
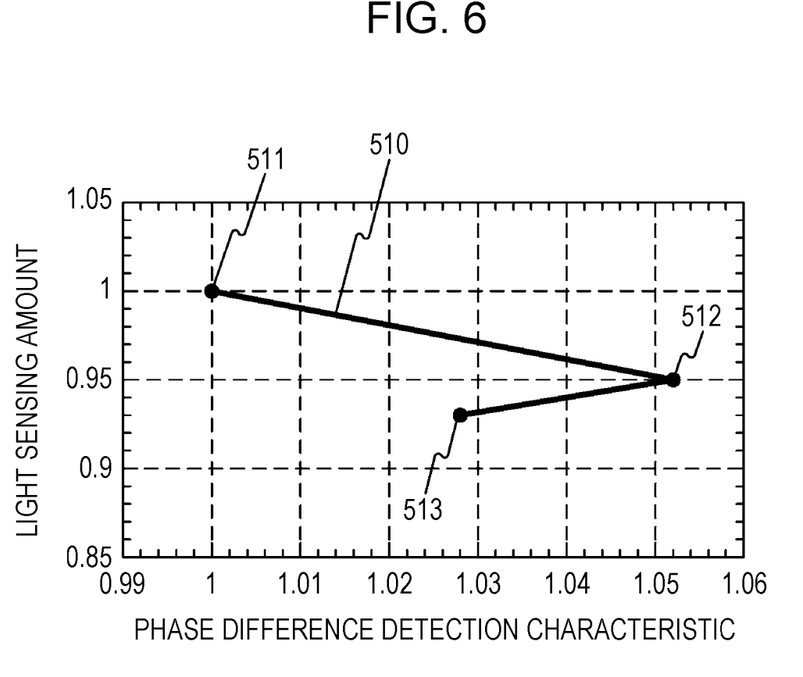
FIG. 6 is a graph illustrating an example of the relationship between the aperture width and the phase difference detection characteristic in the light blocking layer of the phase difference detection pixel according to the first embodiment of the present disclosure.

Example of Relationship Between Aperture Width of Light Blocking Layer and Phase Difference Detection Characteristics FIG. 6 is a graph illustrating an example of the relationship between the aperture width of the light blocking layer according to the first embodiment of the present disclosure and the phase difference detection characteristics.

In the same figure, the transverse axis expresses phase difference detection characteristics, the longitudinal axis expresses a light sensing amount, and the phase difference detection characteristics of the phase difference detection pixel which are varied depending on an aperture width are denoted by the solid line (solid line 510). In addition, in the same figure, the same aperture width as that of the light blocking layers of the image generation pixel is assumed as the aperture width 100%. In addition, in the transverse axis, the phase difference detection characteristic at the aperture width 100% is indicated by "1", and the phase difference detection characteristics at the respective aperture widths are indicated by relative values. Further, in the longitudinal axis, a light sensing amount at the aperture width 100% is indicated by "1", and light sensing amounts at the respective aperture widths are indicated by relative values. In the same figure, description will be made assuming of a phase difference detection pixel where influence of diffraction is shown if the aperture width is smaller than 70% and a spot diameter becomes larger according to a decrease in the aperture width.

Here, the phase difference detection characteristics will be described. The phase difference detection characteristics are accuracy (characteristics) when the focusing determination unit 183 detects a phase difference based on a signal of the phase difference detection pixel. In the phase difference detection pixel, if a subject light division extent (accuracy) is increased, a distance between centers of a pair of images becomes wide. Thereby, a misalignment amount of images is finely measured, and phase difference detection accuracy (characteristics) is improved. In the same figure, a relationship between the aperture width in the light blocking layers of the phase difference detection pixel and the phase difference detection accuracy (phase difference detection characteristics) will be described.

The solid line 510 denotes the phase difference detection characteristics. The point 511 in the solid line 510 indicates a light sensing amount and the phase difference detection characteristic at the aperture width 100%. In addition, the point 512 indicates a light sensing amount and the phase difference detection characteristic at the aperture width 70%, and the point 513 indicates a light sensing amount and the phase difference detection characteristic at the aperture width 50%.

As shown in the section from the point 511 of the solid line 510 to the point 512 thereof, if the aperture width of the light blocking layers of the phase difference detection pixel becomes smaller from the width (100%) of the image generation pixel, the light sensing amount is reduced and the phase difference detection characteristics are improved. For example, if the aperture width is 70%, the light sensing amount is reduced by about 5% but the phase difference detection characteristics are improved by about 5%.

In addition, as shown in the section from the point 512 of the solid line 510 to the point 513 thereof, a spot diameter on the image forming plane (a position of the pupil division light blocking layer) is increased on the contrary at the aperture width (a width smaller than the aperture width 70%) where influence of diffraction is shown, and thus the phase difference detection characteristics are deteriorated. In other words, the aperture width of the phase difference detection pixel is set to the critical value regarding whether the influence of diffraction is shown (the spot diameter is increased and thus the phase difference detection characteristics are deteriorated) or is not shown (around 70% in FIG. 6), and thereby it is possible to set an optimal aperture width which can improve the phase difference detection characteristics best.

Example of Spot Diameter in Phase Difference Detection Pixel

Figure 7A:
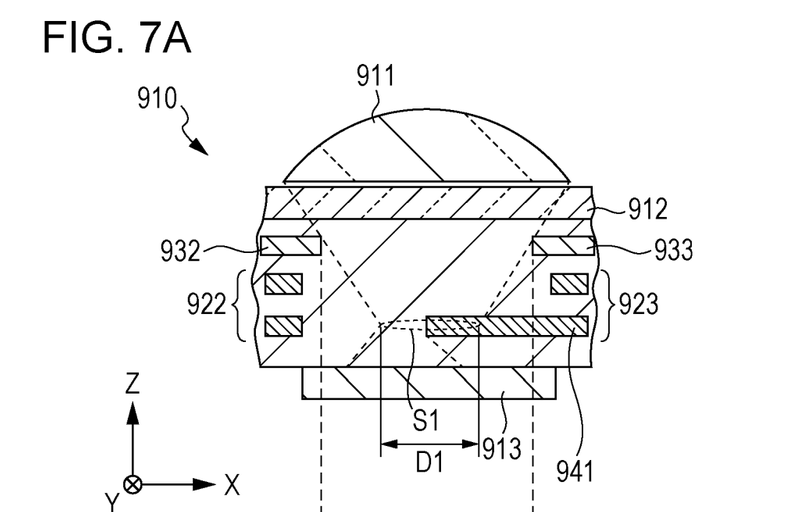
FIGS. 7A and 7B are schematic diagrams illustrating an example of the diameter of the spot generated by the phase difference detection pixel according to the first embodiment of the present disclosure and an example of the diameter of the spot generated by the phase difference detection pixel in the related art.
Figure 7B:
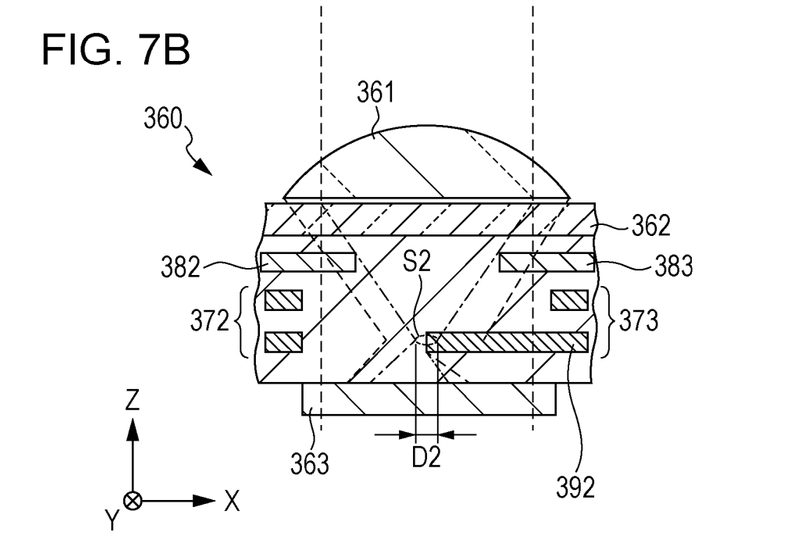

FIGS. 7A and 7B are schematic diagrams illustrating an example of the spot diameter generated by the phase difference detection pixel according to the first embodiment of the present disclosure and an example of the spot diameter generated by the phase difference detection pixel in the related art.

FIG. 7A schematically shows a spot generated by the phase difference detection pixel (left aperture phase difference detection pixel 910) in the related art which has the same light blocking layers as those of the image generation pixel. FIG. 7A shows a micro lens 911, a W filter 912, a light sensing element 913, wires 922 and 923, light blocking layers 932 and 933, and a pupil division light blocking layer 941, as a cross-sectional configuration of the left aperture phase difference detection pixel 910.

In addition, FIG. 7A shows a broken-line ellipse (spot S1) indicating a spot on the image forming plane of the left aperture phase difference detection pixel 910 and an arrow (spot diameter D1) indicating a spot diameter of the spot S1. In FIG. 7A, light beams passing through the left end and the right end of the micro lens 911 are indicated by the broken lines extending from the micro lens 911 to the spot (spot S1). The left end and the right end of the light beams which are incident to the light sensing element 913 from the spot S1 are indicated by the broken lines extending from the spot S1 to the light sensing element 913.

In addition, the respective configurations other than the light blocking layers 932 and 933 are the same as the respective cross-sectional configurations of the left aperture phase difference detection pixel 360 shown in FIG. 4A, and thus description thereof will be omitted here. Further, the light blocking layers 932 and 933 are the same as the light blocking layers (the light blocking layers 341 to 343) of the image generation pixels (the R pixel 310 and the G pixel 320) shown in FIG. 4A, and thus description thereof will be omitted here.

As shown in FIG. 7A, the same light blocking layers as those in the image generation pixel are disposed in the phase difference detection pixel in the related art. In other words, in order to enable light collected by the micro lens to reach the light sensing element with economy, the light blocking layers are disposed such that the aperture area of the aperture portion formed by the light blocking layers is as large as possible. For this reason, in the phase difference detection pixel in the related art, light having passed through the regions around the ends (peripheries) of the micro lens also passes through the aperture portion of the light blocking layers. In other words, in the phase difference detection pixel in the related art, a light collection extent is reduced due to aberration or the like of the micro lens, and thereby a spot diameter on the image forming plane is increased, resulting in deteriorating pupil division accuracy (left and right division accuracy).

FIG. 7B schematically shows a spot generated by the phase difference detection pixel (left aperture phase difference detection pixel 360) according to the first embodiment of the present disclosure. In addition, the left aperture phase difference detection pixel 360 is the same as the left aperture phase difference detection pixel 360 shown in FIG. 4B, which is given the same reference numeral, and description thereof will be omitted here.

In addition, FIG. 7B shows a broken-line ellipse (spot S2) indicating a spot on the image forming plane of the left aperture phase difference detection pixel 360 and an arrow (spot diameter D2) indicating a spot diameter of the spot S2. In FIG. 7B, light beams passing through the left end and the right end of the micro lens 361 are indicated by the chain lines extending from the micro lens 361 to the spot (spot S2). The left end and the right end of the light beams which are incident to the light sensing element 363 from the spot S2 are indicated by the chain lines extending from the spot S2 to the light sensing element 363. Further, in FIG. 7B, the light paths shown in FIG. 7A are indicated by the thin broken lines.

As shown in FIG. 7B, in the phase difference detection pixel according to the first embodiment of the present disclosure, the light blocking layers are disposed such that the aperture area of the aperture portion formed by the light blocking layers of the phase difference detection pixel is smaller than the aperture area of the aperture portion formed by the light blocking layers of the image generation pixel. For this reason, light beams passing through the regions around the ends (peripheries) of the micro lens are blocked by the light blocking layers in the phase difference detection pixel according to the first embodiment of the present disclosure. Therefore, a decrease in the light collection extent due to the aberration or the like of the micro lens is alleviated, and thereby a spot diameter in the image forming plane is decreased, resulting in improving the pupil division accuracy (left and right division accuracy).

As such, in the first embodiment of the present disclosure, the aperture area of the aperture portion formed by the light blocking layers (layers close to the micro lens and blocking light) of the phase difference detection pixel is smaller than the aperture area of the light blocking layers of the image generation pixel, thereby improving characteristics of the phase difference detection pixel.

2. Second Embodiment

In the first embodiment of the present disclosure, an example where the aperture width of the light blocking layers of the phase difference detection pixel is smaller than the aperture width of the light blocking layers of the image generation pixel has been described using the cross-sectional configuration of the phase difference detection pixel and the image generation pixel. Since the shapes of the aperture portions are similar to each other in the first embodiment of the present disclosure, if the aperture width is small, the aperture area of the aperture portion formed by the light blocking layers is also small, and thereby the pupil division accuracy is improved. In addition, it is preferable that the aperture area of the aperture portion formed by the light blocking layers of the phase difference detection pixel be smaller than the aperture area of the aperture portion formed by the light blocking layers of the image generation pixel in order to improve the pupil division accuracy, and the present disclosure is not limited to an aperture shape.

Therefore, in the second embodiment of the present disclosure, an example of the aperture shape of the light blocking layers of the phase difference detection pixel and an example of the aperture shape of the light blocking layers of the image generation pixel will be described with reference to FIGS. 8A to 8C.

Figure 8A:
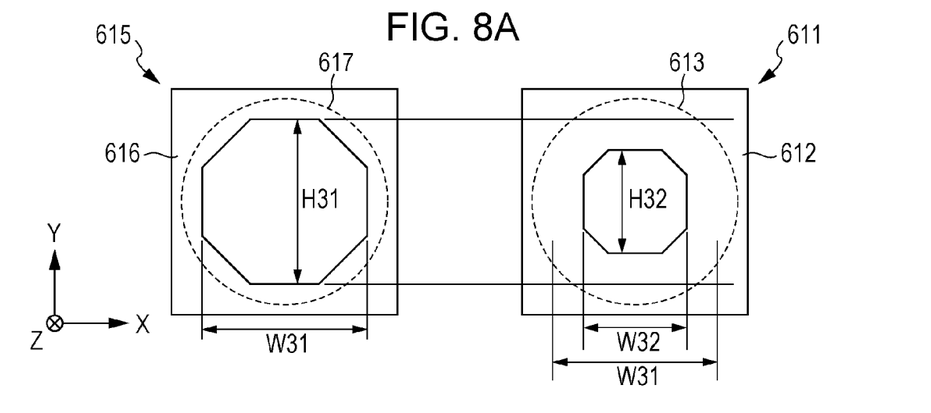
FIGS. 8A to 8C are diagrams illustrating an example of the aperture shapes of the light blocking layers in the phase difference detection pixel and the image generation pixel according to a second embodiment of the present disclosure.
Figure 8B:
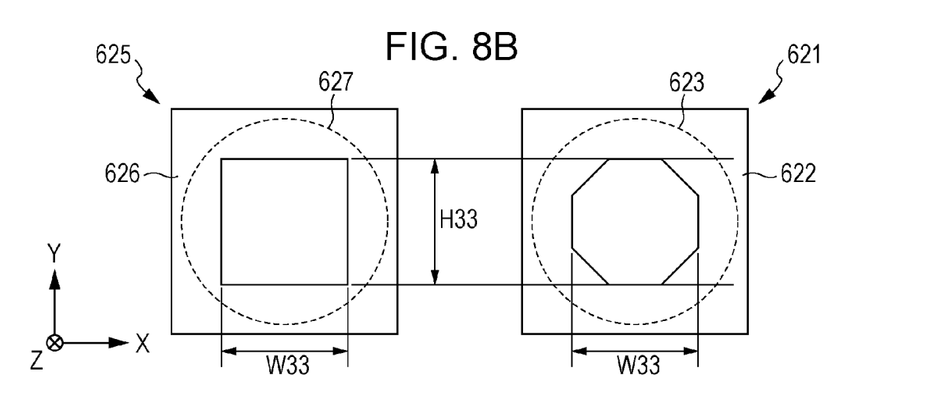
Figure 8C:
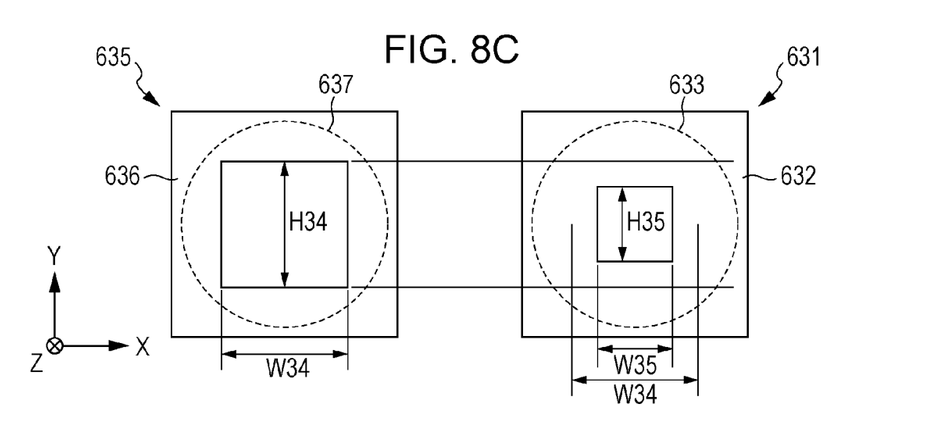

Example of Aperture Shape of Light Blocking Layers in Phase Difference Detection Pixel and Image Generation Pixel FIGS. 8A to 8C are schematic diagrams illustrating an example of the aperture shape of the light blocking layers in the phase difference detection pixel and the image generation pixel according to the second embodiment of the present disclosure.

Description will be made assuming of XY axes having the vertical direction as a Y axis, and the horizontal direction as an X direction in the same figures.

FIG. 8A shows a case where the aperture shape is an octagonal shape in both the pixels as an example of the aperture shape of the light blocking layers in the image generation pixel (image generation pixel 615) and the phase difference detection pixel (phase difference detection pixel 611). In the image generation pixel 615, a light blocking layer 616, a micro lens 617, an arrow (arrow W31) indicating the width of the aperture portion, and an arrow (arrow H31) indicating the height of the aperture portion are shown. In addition, in the phase difference detection pixel 611, a light blocking layer 612, a micro lens 613, an arrow (arrow W32) indicating the width of the aperture portion, an arrow (arrow H32) indicating the height of the aperture portion, an arrow (arrow W31) indicating the width of the image generation pixel 615 are shown.

As shown in FIG. 8A, in a case where the shapes of the aperture portions of the phase difference detection pixel and the image generation pixel are similar to each other, the height (arrow H32) and the width (arrow W32) of the aperture portion of the phase difference detection pixel is made to be smaller than the height (arrow H31) and the width (width W31) of the image generation pixel.

FIG. 8B shows a case where the aperture shape of the image generation pixel is a square shape, and the aperture shape of the phase difference detection pixel is an octagonal shape as an example of the aperture shape of the light blocking layers in the image generation pixel (image generation pixel 625) and the phase difference detection pixel (phase difference detection pixel 621). In the image generation pixel 625, a light blocking layer 626, a micro lens 627, an arrow (arrow W33) indicating the width of the aperture portion, and an arrow (arrow H33) indicating the height of the aperture portion are shown. In addition, in the phase difference detection pixel 621, a light blocking layer 622, a micro lens 623, an arrow (arrow W33) indicating the width of the aperture portion, and an arrow (arrow H33) indicating the height of the aperture portion are shown. The arrow W33 and the arrow H33 indicate that the aperture portions of the image generation pixel and the phase difference detection pixel have the same width and height.

As shown in FIG. 8B, in a case where the aperture shape of the image generation pixel is a square shape, and the aperture shape of the phase difference detection pixel is an octagonal shape, even if the widths (widths in the X axis direction) and the heights (widths in the Y axis direction) are the same, the aperture area of the aperture portion formed by the light blocking layers of the phase difference detection pixel can be smaller than the aperture area of the aperture portion formed by the light blocking layers of the image generation pixel. In other words, the aperture shape of the phase difference detection pixel is a shape where a portion (four corners) of the aperture shape of the image generation pixel is deleted, and it is possible to block a portion of light beams passing through the end peripheries of the micro lens.

FIG. 8C shows a case where the aperture shape is a square shape in both the pixels as an example of the aperture shape of the light blocking layers in the image generation pixel (image generation pixel 635) and the phase difference detection pixel (phase difference detection pixel 631). In the image generation pixel 635, a light blocking layer 636, a micro lens 637, an arrow (arrow W34) indicating the width of the aperture portion, and an arrow (arrow H34) indicating the height of the aperture portion are shown. In addition, in the phase difference detection pixel 631, a light blocking layer 632, a micro lens 633, an arrow (arrow W35) indicating the width of the aperture portion, an arrow (arrow H35) indicating the height of the aperture portion, an arrow (arrow W34) indicating the width of the image generation pixel 635 are shown.

As shown in FIGS. 8C and 8A, the height and width of the aperture portion of the phase difference detection pixel is made to be smaller than those of the image generation pixel, and thereby it is possible to make the area of the aperture portion small regardless of the shapes of the aperture portions of the phase difference detection pixel and the image generation pixel.

As such, the aperture area of the aperture portion formed by the light blocking layers of the phase difference detection pixel be smaller than the aperture area of the aperture portion formed by the light blocking layers of the image generation pixel (the aperture area of the image generation pixel), and thereby it is possible to improve characteristics of the phase difference detection pixel. Thereby, in the image generation pixel, the aperture area of the image generation pixel is made to be large, and thus an amount of light incident to the light sensing element becomes as much as possible, in the phase difference detection, the aperture area of the aperture portion formed by the light blocking layers is made to be small, thereby improving pupil division accuracy.

In addition, the imaging device according to an embodiment of the present disclosure can be manufactured simply by modifying a mask pattern when manufacturing metal layers (metal layers closest to the micro lens) which are light blocking layers into a mask pattern when manufacturing an imaging device in the related art. That is to say, the imaging device according to the embodiment of the present disclosure can be manufactured only with a simple modification of the process (modification of the mask pattern) in the manufacturing steps of the imaging device in the related art. In addition, structures other than the metal layers closest to the micro lens and the pupil division light blocking layer are the same between the phase difference detection pixel and the image generation pixel, and thus it is possible to suppress non-uniformity of characteristics for the respective pixels in the phase difference detection pixel and the image generation pixel.

In addition, although the embodiments of the present disclosure have been described assuming that the color filters provided in the image generation pixels are color filters of three primary colors (RGB), the present disclosure is not limited thereto. For example, the embodiments of the present disclosure may be also similarly applied to a case where complementary color filters are provided in the image generation pixels. In addition, the embodiments of the present disclosure may also be similarly applied to a case where pixels (for example, an imaging device where a blue pixel, a green pixel, and a red pixel are repeatedly arranged in the optical axis direction) which detect all the light beams of wavelengths in a visible range in one pixel region are the image generation pixels.

In addition, although the embodiments of the present disclosure have been described assuming that the phase difference detection pixel senses one of light pupil-divided into two parts, the present disclosure is not limited thereto. For example, the embodiments of the present disclosure are also applied to a case of a phase difference detection pixel where two light sensing elements are provided instead of the pupil division light blocking layer, and pupil-divided light can be sensed by each light sensing element, thereby improving characteristics of the phase difference detection pixel. In addition, in a case where a light sensing element with a half size is provided instead of the pupil division light blocking layer, one of pupil-divided light can be sensed by the light sensing element with the half size, characteristics of the phase difference detection pixel can also be improved in a similar way.

Further, although the description has been made assuming that the color filter of the phase difference detection pixel is a W filter, the present disclosure is not limited thereto, and if a transparent layer is present instead of the filter, characteristics of the phase difference detection pixel can also be improved in a case where a G filter is provided instead of the W filter, or the like.

Although, in the embodiments of the present disclosure, an example where an image generated by the second signal processing unit 170 is displayed as a live view image has been described, the present disclosure is not limited thereto, and a generated image may be preserved as a moving image.

The embodiments of the present disclosure represent an example for embodying the present disclosure, and as is clearly described in the embodiments of the present disclosure, the matters in the embodiments of the present disclosure respectively have correspondence relationships with matters which specify the present disclosure in the claims. Similarly, the matters which specify the present disclosure in the claims respectively have correspondence relationships with the matters in the embodiments of the present disclosure, which have the same names. However, the present disclosure is not limited to the embodiments, and may be embodied through various modifications of the embodiments in the scope not departing from the spirit of the present disclosure.

The process procedures described in the embodiments of the present disclosure may be grasped as a method including a series of procedures, and may be grasped as a program for enabling a computer to execute a series of procedures or a recording medium storing the program thereon. As the recording medium, for example, a CD (Compact Disc), an MD (Mini Disc), a DVD (Digital Versatile Disc), a memory card, a Blu-ray Disc (registered trademark), or the like may be used.

The present disclosure contains subject matter related to that disclosed in Japanese Priority Patent Application JP 2011-034955 filed in the Japan Patent Office on Feb. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device having an image generation pixel and a phase difference detection pixel, in which the phase difference detection pixel comprises:
   a micro lens that collects light from a subject;
   a light sensing element that generates a signal for performing focusing determination through phase difference detection by sensing subject light collected by the micro lens;
   a first light blocking unit that performs pupil division by blocking a portion of the subject light; and
   a second light blocking unit that is disposed between the first light blocking unit and the micro lens, and blocks the portion of the subject light which is incident to the first light blocking unit,
   said second light blocking unit having an aperture area which lies in an aperture plane which is parallel to a horizontal vertical plane having a horizontal axis and a vertical axis associated with said phase difference detection pixel,
   each side of at least one pair of opposite sides of the aperture area of the second light blocking unit protrudes closer in an orthogonal direction to an axis in the aperture plane which is parallel to an axis which passes through a center of the light sensing element and lies in a plane parallel to the horizontal vertical plane, as compared to corresponding sides of an aperture area of the image generation pixel, and
   the aperture area of the second light blocking unit is smaller than the aperture area of the image generation pixel.

2. The imaging device according to claim 1, wherein the second light blocking unit is formed by the same layer as a light blocking layer which forms an aperture portion related to the aperture area of the image generation pixel.

3. The imaging device according to claim 1, wherein the second light blocking unit is formed by a layer close or adjacent to the micro lens, of layers blocking light between the micro lens and the light sensing element.

4. The imaging device according to claim 1, wherein the micro lens is a micro lens having the same shape as a micro lens which collects light incident to the image generation pixel.

5. The imaging device according to claim 1, wherein a shape of the aperture portion related to the aperture area of the second light blocking unit is similar to a shape of the aperture portion related to the aperture area of the image generation pixel.

6. An imaging apparatus comprising:
   an imaging device having an image generation pixel and a phase difference detection pixel, in which the phase difference detection pixel includes a micro lens that collects light from a subject, a light sensing element that generates a signal for performing focusing determination through phase difference detection by sensing subject light collected by the micro lens, a first light blocking unit that performs pupil division by blocking a portion of the subject light, and a second light blocking unit that is disposed between the first light blocking unit and the micro lens, and blocks the portion of the subject light which is incident to the first light blocking unit, said second light blocking unit having an aperture area which lies in an aperture plane which is parallel to a horizontal vertical plane having a horizontal axis and a vertical axis associated with said phase difference detection pixel, each side of at least one pair of opposite sides of the aperture area of the second light blocking unit protrudes closer in an orthogonal direction to an axis in the aperture plane which is parallel to an axis which passes through a center of the light sensing element and lies in a plane parallel to the horizontal vertical plane as compared to corresponding sides of an aperture area of the image generation pixel, and the aperture area of the second light blocking unit is smaller than the aperture area of the image generation pixel;

a focusing determination unit that performs focusing determination through phase difference detection based on a signal generated by the phase difference detection pixel; and an image generation unit that generates an image based on a signal generated by the image generation pixel.

7. An imaging device comprising:

a micro lens that collects subject light;

a light sensing element that generates a signal for performing focusing determination through phase difference detection by sensing subject light collected by the micro lens; and a second light blocking unit that is disposed between the micro lens and an image forming point of the subject light collected by the micro lens in an optical axis direction of the micro lens, and enables an extent of light collection performed by the micro lens to be larger than an extent of light collection in an image generation pixel, said second light blocking unit having an aperture area which lies in an aperture plane which is parallel to a horizontal vertical plane having a horizontal axis and a vertical axis associated with said phase difference detection pixel, each side of at least one pair of opposite sides of the aperture area of the second light blocking unit protrudes closer in an orthogonal direction to an axis in the aperture plane which is parallel to an axis which passes through a center of the light sensing element and lies in a plane parallel to the horizontal vertical plane as compared to corresponding sides of an aperture area of the image generation pixel, and the aperture area of the second light blocking unit is smaller than the aperture area of the image generation pixel.

8. The imaging device according to claim 1, in which each side of each pair of opposite sides of the aperture area of the second light blocking unit protrudes closer in the orthogonal direction as compared to the corresponding sides of the aperture area of the image generation pixel.

* * * * *